United States Patent [19]
Omura et al.

[11] Patent Number: 5,306,766
[45] Date of Patent: Apr. 26, 1994

[54] LOW HARDNESS SILICONE RUBBER COMPOSITIONS

[75] Inventors: Naoki Omura; Masaharu Takahashi; Tomiyoshi Tsuchida, all of Annaka, Japan

[73] Assignee: Shin-Etsu Chemical Co., Ltd., Tokyo, Japan

[21] Appl. No.: 939,481

[22] Filed: Sep. 4, 1992

[30] Foreign Application Priority Data

Sep. 4, 1991 [JP] Japan .................. 3-254613

[51] Int. Cl.$^5$ .......................... C08K 5/01; C08K 3/36
[52] U.S. Cl. ................................. 524/588; 524/731; 524/789; 524/866; 524/847
[58] Field of Search ............... 524/588, 731, 789, 866, 524/847

[56] References Cited

U.S. PATENT DOCUMENTS 2,666,041  4/1952  Pfeifer .................. 524/588
4,778,860 10/1988  Morita et al. ......... 525/431

Primary Examiner—John C. Bleutge
Assistant Examiner—M. Glass
Attorney, Agent, or Firm—Millen, White, Zelano & Branigan

[57] ABSTRACT

A silicone rubber composition comprising (A) an alkenyl-containing organopolysiloxane, (B) a polycyclic aromatic compound having at least two phenyl groups, and (C) finely divided silica is easy to process and cures to silicone rubber having low hardness while retaining good physical properties.

9 Claims, No Drawings

LOW HARDNESS SILICONE RUBBER COMPOSITIONS

This invention relates to a novel silicone rubber composition having improved process-ability and workability and a silicone rubber obtained by curing the silicone rubber composition.

BACKGROUND OF THE INVENTION

Silicone rubbers have improved heat resistance, weather resistance, durability, releasability, and electrical properties and are formable or moldable to any desired shape. They have found a wide variety of uses as building materials, electric and electronic parts, automobile parts and business machines. Because the use of business machines is now expanding, silicone rubbers, partially because of their improved compression set, in addition to the above-mentioned properties, are now indispensable as roll materials for copying machines and printers.

Roll material require silicone rubbers of low hardness. Most often, low hardness silicone rubbers having a hardness as low as 40 or less in JIS A scale are employed. There is a demand for silicone rubber having a lower hardness. In general, low hardness silicone rubbers are obtained by reducing the vinyl group content of a predominant polymer component in a silicone rubber composition or reducing the content of silica filler therein. However, a certain limit exists when reducing the vinyl content. With too low a content of silica filler, compositions lose shape retention ability so that it becomes difficult to work or deal with the silicone rubber for processing or molding. Also they experience an extreme drop of physical properties such as tensile strength and tear strength. Conventional low hardness silicone rubber compositions are thus difficult to produce. Add Teflon powder to silicone rubber compositions to compensate for a reduction of the silica filler in order to secure shape retention is known although poor dispersion of Teflon powder is a problem.

SUMMARY OF THE INVENTION

An object of the present invention is to provide a silicone rubber composition capable of curing to low hardness while maintaining processability of the composition and the physical properties of the cured rubber. Another object is to provide a low hardness silicone rubber.

We have found that when a polycyclic aromatic compound having two or more phenyl groups in a molecule, especially a polycyclic aromatic compound containing a naphthalene skeleton is added to a silicone-rubber composition comprising an alkenyl group-containing organopolysiloxane and finely divided silica, quite unexpectedly, the polycyclic aromatic compound functions as an effective hardness lowering agent. There is obtained a silicone rubber composition which is easy to process or mold and which can be cured into a silicone rubber of low hardness without lowering its plasticity and physical properties.

According to the present invention, there is provided a silicone rubber composition comprising (A) an organopolysiloxane of the following average compositional formula:

$$R_a SiO_{(4-a)/2} \quad (1)$$

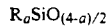

wherein R is a substituted or unsubstituted monovalent hydrocarbon group, at least one alkenyl group being contained in an amount of 0.0001 to 0.5 mol % of the R groups, and letter a is a positive number of from 1.95 to 2.05, (B) a polycyclic aromatic compound having at least two phenyl groups, and (C) finely divided silica having a specific surface area of at least 50 m²/g.

DETAILED DESCRIPTION OF THE INVENTION

Broadly stated, the silicone rubber composition of the present invention is defined as comprising (A) an alkenyl-containing organopolysiloxane, (B) a polycyclic aromatic compound having at least two phenyl groups, and (C) finely divided silica.

Component (A) is an organopolysiloxane of the following average compositional formula (1):

$$R_a SiO_{(4-a)/2} \quad (1)$$

wherein R is a substituted or unsubstituted monovalent hydrocarbon group. It is necessary that 0.0001 to 0.5 mol %, preferably 0.01 to 0.3 mol % of the R groups is an alkenyl group such as vinyl and allyl groups. Organopolysiloxanes with an alkenyl group content of less than 0.0001 mol % are less curable whereas, with an alkenyl content of more than 0.5 mol %, silicone rubber compositions cure to silicone rubbers of poor properties.

The preferred monovalent hydrocarbon groups represented by R other than the alkenyl group are those having 1 to 10 carbon atoms, especially 1 to 3 carbon atoms, for example, alkyl groups such as methyl, ethyl, propyl, butyl, pentyl, hexyl, octyl, decyl and dodecyl groups; aryl groups such as phenyl and tolyl groups; aralkyl groups such as β-phenylethyl group; and substituted ones thereof in which some or all of the hydrogen atoms attached to carbon atoms are replaced by halogen atoms (e.g., fluorine), cyano and other groups, such as cyanoethyl and 3,3,3-trifluoropropyl groups. Most often the methyl group is used although up to 20 mol % of phenyl group may be contained where low-temperature resistance, radiation resistance and transparency are required. Inclusion of cyanoethyl and 3,3,3-trifluoropropyl groups is also preferred where oil resistance and gasoline resistance are required.

Letter a is a positive number of from 1.95 to 2.05 and most often a number approximate to 2.

Component (A) or organopolysiloxane should preferably have a degree of polymerization of at least 3,000, especially 4,000 to 10,000 for satisfactory mechanical strength.

The organopolysiloxane is essentially composed of diorganopolysiloxane units although minor proportions of triorganosiloxy, mono-organosiloxane and $SiO_2$ units may be present. Also it may be blocked with a hydroxyl group or triorganosiloxy unit at a molecular chain end.

Component (B) is a polycyclic aromatic compound having at least two phenyl groups which forms a key feature of the present invention since it serves as a hardness lowering agent. Examples-include naphthalene, 1-naphthol, anthracene, phenanthrene, biphenyl, pyrene and naphthacene, with those having a naphthalene skeleton being preferred.

Among the polycyclic aromatic compounds, those which are less susceptible to sublimation may be added during blending of other components while naphthalene and other similar components which may sublimate ones should preferably be added after other components have been blended and heat treated. Since most of these compounds are crystalline, they may be added as such. In view of dispersion, it is preferred to premix the compound with component (A) or organopolysiloxane to form a paste which is blended with other components.

Component (B) is preferably added in an amount of about 0.05 to 5 parts, more preferably about 0.1 to 1 part by weight per 100 parts by weight of component (A) or organopolysiloxane. Less than 0.05 parts of component (B) on this basis would not incur a substantial lowering of hardness whereas more than 5 parts would detract from physical properties in normal conditions, especially compression set.

Component (C) is finely divided silica which has a specific surface area of at least 50 $m^2/g$, preferably 100 to 400 $m^2/g$ for imparting adequate hardness to the silicone rubber and improving mechanical strength such as tensile strength. Examples of the finely divided silica include fumed silica, fired silica and precipitated silica, alone or in admixture of two or more. The silica may be surface treated with linear organopolysiloxanes, cyclic organopolysiloxanes, hexamethyldisilazane, dichlorodimethylsilane, etc. The silica is preferably added in an amount of about 5 to 50 parts, more preferably about 10 to 50 parts by weight per 100 parts by weight of component (A) or organopolysiloxane. Less than 5 parts or more than 50 parts by weight of silica would deteriorate the processability of silicone rubber or detract from mechanical strength.

A dispersing agent for the silica is preferably blended to the composition. The silica dispersant is one ordinarily used as a silicone rubber dispersant and examples thereof include α, ω-polysiloxanediol, hexamethyldisilazane, methoxysilane, and diphenylsilanediol. The dispersant is an effective wetter in compounding component (A) or organopolysiloxane and component (C) or finely divided silica. The silica dispersant is preferably added in an amount of about 0.1 to 15 parts by weight per 100 parts by weight of component (A) or organopolysiloxane.

The composition of the present invention may further contain any of various well-known rubber additives commonly blended in conventional silicone rubber compositions, for example, ground silica, diatomaceous earth, iron oxide, zinc oxide, titanium oxide, carbon black, barium oxide, magnesium oxide, cerium oxide, calcium carbonate, magnesium carbonate, zinc carbonate, asbestos, glass wool, fine mica, fused silica powder and the like in such amounts that the object of the present invention may not be impaired. Further, pigments, dyes, anti-aging agents, antioxidants, antistatic agents, flame retardants (e.g., antimony oxide and chlorinated paraffin), and heat transfer modifiers (e.g., boron nitride and aluminum oxide) may be blended if desired.

The silicone rubber composition of the present invention may be prepared by any desired method, preferably by charging a milling means such as a kneader with component (A) organopolysiloxane, (B) polycyclic aromatic compound, (C) finely divided silica, and (D) dispersant, blending the ingredients at room temperature, and heat treating the blend at a temperature of 100° to 200° C. for about 1 to 5 hours, or by charging a milling means such as a kneader with components (A), (C) and (D), blending the ingredients at room temperature, heat treating the blend at a temperature of 100° to 200° C. for about 1 to 5 hours, cooling the blend, and adding component (B), with the latter method being preferred.

For curing the silicone rubber composition of the invention, any desired conventional curing procedure may be used although vulcanization in the presence of an organic peroxide catalyst is desirable. The organic peroxide may be selected from those commonly used in curing peroxide curing type silicone rubbers, for example, benzoyl peroxide, bis(2,4-dichlorobenzoyl) peroxide, di-t-butyl peroxide, 2,5-dimethyl-di-t-butylperoxyhexane, t-butyl-perbenzoate, t-butyl-peroxyisopropylcarbonate, and dicumyl peroxide, alone or in admixture of two or more. The organic peroxide is preferably added in an amount of about 0.01 to 3 parts, more preferably about 0.05 to 1 part by weight per 100 parts by weight of the organopolysiloxane. With the aid of such peroxides, the silicone rubber compositions of the invention can be cured by heating at a temperature of about 100° to 400° C. for about 1 minute to about 5 hours.

In this way, cured silicone rubber products having a low hardness are obtained. Irrespective of the low hardness of silicone rubbers, the silicone rubber compositions themselves have a high Williams plasticity so that they are useful as extrusion moldable materials for the fabrication of building gaskets, facsimile rolls, medical tubes and the like. They are also useful in the fabrication of rubber contacts, nipples, synchro-joint boots, plug boots, anode caps, and insulated wires.

EXAMPLE

Examples of the invention are given below by way of illustration and not by way of limitation. All parts are by weight.

EXAMPLE 1 AND COMPARATIVE EXAMPLES 1-2

To 100 parts of a methylvinylpolysiloxane (raw rubber) consisting of 99.975 mol % of a dimethylsiloxy unit and 0.025 mol % of a dimethylvinylsiloxy unit and having an average degree of polymerization of about 4,000 were added 2.6 parts of a methylsiloxane represented by the average compositional formula: $HO(CH_3)_2Si(OSi(CH_3)_2)_3OH$ and 25 parts of fumed silica having a specific surface area of 200 $m^2/g$ (Aerosil 200 manufactured by Nippon Aerosil K.K.). Base Compound I was prepared by milling the ingredients in a kneader, and heat treating at 170° C. for 2 hours.

Base Compound II was prepared by the same procedure as Base Compound I except that 20 parts of Aerosil 200 and 2.1 parts of the methylsiloxane of formula: $HO(CH_3)_2Si(OSi(CH_3)_2)_3OH$ were used.

Separately, a paste (Paste A) was prepared by mixing 50 parts of the methylvinylsiloxane used in Base Compound I and 50 parts of phenanthrene in a mixing roll and uniformly milling the mix in a three roll mill.

To 100 parts of Base Compound I were added 0.6 parts of Paste A and 1.5 parts of 2,4-dichlorobenzoyl peroxide (50% paste in dimethylsilicone oil). The composition was press cured at 120° C. for 10 minutes and post cured at 200° C. for 4 hours (Example 1).

To 100 parts of each of Base Compounds I and II was added 1.5 parts of 2,4-dichlorobenzoyl peroxide (50% paste in dimethylsilicone oil). The compositions were cured as in Example 1 (Comparative Examples 1 and 2).

The cured silicone rubber products of Example 1 and Comparative Examples 1 and 2 were measured for physical properties in normal conditions in accordance with JIS K-6301. Prior to curing, the respective silicone rubber compositions were measured for plasticity using a Williams parallel plate plastometer and evaluated for processability. The results are shown in Table 1.

TABLE 1

|  | Example | Comparative Example |  |
|---|---|---|---|
|  | 1 | 1 | 2 |
| Silicone rubber |  |  |  |
| Hardness, JIS A scale | 31 | 38 | 32 |
| Tensile strength, kgf/cm² | 116 | 90 | 60 |
| Elongation, % | 690 | 530 | 650 |
| Tear strength, kgf/cm | 14 | 12 | 8 |
| Impact resilience, % | 46 | 64 | 64 |
| Compression set, % (150° C./22 hrs) | 34 | 15 | 16 |
| Composition |  |  |  |
| Williams plasticity | 165 | 168 | 120 |
| Processability | Good | Good | Sag Poor |

EXAMPLE 2 AND COMPARATIVE EXAMPLES 3-4

To 70 parts of a methylvinylpolysiloxane (raw rubber) consisting of 99.825 mol % of a dimethylsiloxy unit, 0.15 mol % of a methylvinylsiloxy unit and 0.025 mol % of a dimethylvinylsiloxy unit and having an average degree of polymerization of about 4,000 and 30 parts of a methylvinylpolysiloxane (raw rubber) consisting of 99.975 mol % of a dimethylsiloxy unit and 0.025 mol % of a dimethylvinylsiloxy unit and having an average degree of polymerization of about 4,000 were added 10 parts of silica fine powder having a specific surface area of 380 m²/g (A-300 manufactured by Nippon Aerosil K.K.) which had been surface treated with hexamethyldisilazane, 10 parts of crystalline silica having a specific surface area of 2 m²/g (Crystallite manufactured by Tatsumori K.K.), 0.5 parts of α,ω-dimethylpolysiloxane diol having a degree of polymerization of 16, and 0.3 parts of vinyltrimethoxysilane. Base Compound III was prepared by mixing the ingredients until uniform, milling the blend in a kneader, and heat treating at 170° C. for 1.5 hours.

Separately, a paste (Paste B) was prepared by the same procedure as Paste A in Example 1 except that the phenanthrene was replaced by anthracene.

To 100 parts of Base Compound III were added 0.7 parts of Paste B and 0.5 parts of 2,5-bis(t-butyl peroxy)-hexane. The composition was press cured at 170° C. for 10 minutes and post cured at 200° C. for 4 hours (Example 2).

To 100 parts of Base Compound III was added 0.5 parts or 0.1 parts of 2,5-bis(t-butyl peroxy)hexane (Comparative Examples 3 and 4). The compositions were cured as in Example 2.

The silicone rubber compositions and cured silicone rubber products of Example 2 and Comparative Examples 3 and 4 were examined as in Example 1. The results are shown in Table 2.

TABLE 2

|  | Example | Comparative Example |  |
|---|---|---|---|
|  | 2 | 3 | 4 |
| Silicone rubber |  |  |  |
| Hardness, JIS A scale | 18 | 22 | 20 |
| Tensile strength, kgf/cm² | 28 | 25 | 23 |

TABLE 2-continued

|  | Example | Comparative Example |  |
|---|---|---|---|
|  | 2 | 3 | 4 |
| Elongation, % | 690 | 500 | 650 |
| Tear strength, kgf/cm | 4 | 4 | 3 |
| Impact resilience, % | 65 | 79 | 76 |
| Compression set, % (150° C./22 hrs) | 10 | 11 | 18 |
| Composition |  |  |  |
| Williams plasticity | 114 | 115 | 115 |

It is seen from Table 2 that as compared with Comparative Example 3, Comparative Example 4 has a little lower hardness and suffers from a higher compression set, while Example 2 is successful in lowering only hardness while maintaining physical properties and plasticity. It is evident that anthracene as component (B) was effective for lowering the hardness of silicone rubber.

There has been described a silicone rubber composition which maintains high plasticity so that it is satisfactory in processing or molding while yielding a cured product of lower hardness. By virtue of plasticity, the composition is useful as extrusion molding material. The low hardness silicone rubber obtained by curing the composition has sufficiently low hardness and high physical properties to find utility in copying machine rolls or the like.

Although some preferred embodiments have been described, many modifications and variations may be made thereto in the light of the above teachings. It is therefore to be understood that within the scope of the appended claims, the invention may be practiced otherwise than as specifically described.

We claim:

1. A silicone rubber composition comprising
    (A) an organopolysiloxane of the following average compositional formula:

$$R_aSiO_{(4-a)/2} \tag{1}$$

wherein R is a substituted or unsubstituted monovalent hydrocarbon group, at least one alkenyl group being contained in an amount of 0.0001 to 0.5 mol % of the R groups, and letter a is a positive number of from 1.95 to 2.05,
    (B) a polycyclic aromatic compound having at least two phenyl groups, which is naphthalene, 1-naphthol, anthracene, phenanthrene, biphenyl, pyrene or naphthacene, and
    (C) finely divided silica having a specific surface area of at least 50 m² g.

2. The silicone rubber composition of claim 1 which contains
    100 parts by weight of organopolysiloxane (A),
    about 0.05 to 5 parts by weight of aromatic compound (B), and
    about 5 to 50 parts by weight of finely divided silica (C).

3. The silicon rubber composition of claim 1, wherein non-alkenyl R groups have 1-10 carbon atoms and are alkyl, aryl, or aralkyl, each optionally substituted by halogen, cyano, cyanoethyl or 3,3,3-trifluoropropyl.

4. The silicone rubber composition of claim 1, wherein non-alkenyl R groups are phenyl, tolyl, or β-phenylethyl.

5. The silicone rubber composition of claim 1, wherein component (A) has a degree of polymerization of at least 3,000.

6. The silicone rubber composition of claim 1, wherein component (A) has a degree of polymerization of 4,000 to 10,000.

7. The silicone rubber composition of claim 1, wherein component (B) is selected from the group consisting of naphthalene, 1-naphthol, anthracene, phenanthrene, pyrene and naphthacene.

8. A low hardness silicone rubber obtained by curing a silicone rubber composition as set forth in claim 1.

9. A silicone rubber composition comprising (A) an organopolysiloxane of the following average compositional formula:

$$R_a SiO_{(4-a)/2} \qquad (1)$$

wherein R is a substituted or unsubstituted monovalent hydrocarbon group, at least one alkenyl group being contained in an amount of 0.0001 to 0.5 mol % of the R groups, and letter a is a positive number of from 1.95 to 2.05, (B) a polycyclic aromatic compound having at least two phenyl groups, which is a fused ring system, and (C) finely divided silica having a specific surface area of at least 50 $m^2$ g.

* * * * *